United States Patent [19]

Greene et al.

[11] Patent Number: 4,819,758
[45] Date of Patent: Apr. 11, 1989

[54] VEHICLE FOR DELIVERING LARGE CYLINDRICAL SHAPED LOADS AND THE LIKE

[75] Inventors: H. Jack Greene, Plantation; Russell J. Royer, Pembroke Pines; Robert L. Smidl, Jr., Davie; Scott D. Renkes, Miami Lakes, all of Fla.

[73] Assignee: EDS Technologies Inc., Hialeah, Fla.

[21] Appl. No.: 85,231

[22] Filed: Jul. 29, 1987

Related U.S. Application Data

[63] Continuation of Ser. No. 618,045, Jun. 7, 1984, abandoned.

[51] Int. Cl.[4] .............................................. B62D 1/24
[52] U.S. Cl. ..................................... 180/168; 410/49; 414/911; 414/745.7
[58] Field of Search ............... 180/168, 199, 252, 253; 414/748, DIG. 910, DIG. 911; 410/47, 49, 94

[56] References Cited

U.S. PATENT DOCUMENTS

| 2,713,918 | 7/1955 | Framhein | 180/253 |
| 2,720,993 | 10/1955 | Lull | 414/910 |
| 3,968,559 | 7/1976 | Karlsson | 180/168 |
| 4,078,630 | 3/1978 | Krieg | 180/168 |
| 4,138,159 | 2/1979 | Hall | 414/911 |
| 4,437,533 | 3/1984 | Bierkarre et al. | 180/168 |
| 4,460,135 | 7/1984 | Hirakawa et al. | 414/911 |
| 4,509,891 | 4/1985 | Lipscomb | 414/911 |

FOREIGN PATENT DOCUMENTS

| 666104 | 7/1963 | Canada | 180/253 |
| 2409498 | 9/1975 | Fed. Rep. of Germany | 414/748 |
| 2038279 | 7/1980 | United Kingdom | 414/911 |

Primary Examiner—Joseph E. Valenza
Attorney, Agent, or Firm—Finnegan, Henderson, Farabow, Garrett & Dunner

[57] ABSTRACT

A vehicle including a receiver for tracking signals generated by a wire for directing the vehicle to follow the wire which loops between loading and unloading positions. Sensors detect the vehicle for moving a swingable member to a first position and locking the member to cradle the load on the vehicle. Drivewheel assemblies arranged along one longitudinal side of the vehicle are rotatable to steer the vehicle and to move the wheels to a position to move the vehicle sidewise for delivering the load to a utilization device at the unloading location. The side of the vehicle opposite the side of the drive wheel assemblies is provided with caster assemblies enabling the side of the caster assemblies to be of a significantly reduced height relative to the opposite side thereof to permit the load to be dispensed and enable the vehicle to be withdrawn from beneath the load when the lifted swingable member is lowered. The forward and rearward drive wheel assemblies receive steering signals from independent receiver antennas. The forward drive wheel assembly receives a speed signal from its receiver antenna. The rearward drive wheel assembly senses the load on the forward drive wheel assembly for controlling the drive on the rearward drive wheel assembly. Light sensors are provided on the vehicle responsive to modulated light of a predetermined wave length for selectively halting movement of the vehicle.

14 Claims, 10 Drawing Sheets

VEHICLE FOR DELIVERING LARGE CYLINDRICAL SHAPED LOADS AND THE LIKE

This application is a continuation, of application Ser. No. 618,045, filed June 7, 1984 now abandoned.

FIELD OF THE INVENTION

The present invention relates to automated vehicles and more particularly to vehicles responsive to predetermined signals for receiving, transporting and delivering a load placed upon a vehicle of low profile and having carrying apparatus for selectively holding and releasing a load from movement upon the vehicle responsive to predetermined control signals.

BACKGROUND OF THE INVENTION

There is an increasing growth in the use of robotic devices for carrying out activities previously performed through the use of manual labor. One example is the use of a vehicle guided by a signal transmitted by a wire arranged in the floor upon which the vehicle travels. A receiver mounted upon the vehicle tracks the signal which is coupled to drive means for driving the vehicle wheel assembles to cause the vehicle to follow the wire transmitting the aforementioned signal. Although vehicles of the above-described type have reached an advanced stage of development, the ability to load and unload such vehicles as well as placement of the vehicles to both receive and unload items is still a problem.

BRIEF DESCRIPTION OF THE INVENTION

The present invention is characterized by and relates to an automatic guided vehicle (AGV) which comprises means for receiving, supporting, carrying and unloading a large load in an automatic unattended manner to substantially eliminate a significant amount of activity conventionally performed manually.

More specifically, the invention comprises onboard receivers for detecting a signal carried by a wire imbedded in the floor for operating drive wheel assemblies to cause the vehicle to follow the path of the aforementioned transmitting wire.

In order to cradle a load, a sensor is provided to accurately locate the vehicle relative to the load it is receiving. More specifically, the vehicle is designed to receive and carry a cylindrical shaped roll of either standard length, one half standard length or one quarter standard length. Transmitting units arranged at the load dispensing and receiving locations are selectively energized to position the AGV relative to the load which it is to respectively receive and dispense.

Once the load is placed upon the AGV, presence detection sensors are activated to cause a swingable plate to swing upwardly to inclined position, forming a generally V-shaped cradle for supporting and positioning the roll and preventing the roll from moving while it is on the AGV.

The aforementioned receivers are enabled by the presence of the load to track the signal developed by the transmitting wire to move the vehicle to the unloading location where a reel stand is typically provided.

A second wire intersecting the first mentioned wire and located at the load receiving position is sensed by the AGV receiver means, the signal transmitted thereby serving to halt the vehicle, and causing the drive wheel assemblies to be rotated to enable the vehicle to move in the differential drive direction which is transverse to the normal steer drive direction and causing the motors of the drive wheel assemblies to impart drive to the wheels, after the aforementioned rotation is completed, to move the vehicle to the desired unloading position.

The aforementioned vehicle-mounted sensor utilized at the loading position is again utilized at the unloading position and senses the presence of a modulated signal which serves to halt the vehicle when the unloading position is reached.

The load receiving location typically comprises a reel stand having cooperating spindles which are inserted into the roll core which lifts the roll through a small displacement distance relative to the vehicle and sufficient to enable the presence detecting sensors to detect the removal of the roll which causes drive means to unlock and lower the swingable plate forming an integral part of the aforementioned V-shaped cradle and enabling the vehicle to back away from the unloading position as it tracks the aforementioned cross wire to return the vehicle to the first mentioned transmitting wire utilized to control the vehicle during the steer drive mode. The drive wheel assemblies are unlocked from the differential drive position, rotated one-quarter turn to the normal steer drive position and the receivers on the vehicle again track the first mentioned transmitting wire, which is typically arranged in a closed loop, to return the vehicle to the load receiving location where the aforementioned cycle is repeated.

When the vehicle is in the steer drive mode, one drive wheel assembly is operated as a master while the other drive wheel assembly is operated as a slave to the master for receiving signals relating to the vehicle operating speed. The master and slave drive wheel assemblies receive independent steering signals from master and slave receivers respectively associated therewith. Thus, any changes in the load imposed upon the vehicles causing any changes in the operating speed of the master wheel assembly are conveyed to the slave wheel assembly which monitors the armature current of the master unit drive motor.

The master and slave drive unit assemblies are arranged along one side of the vehicle and between said one longitudinal side and the cradle assembly. First and second freewheeling caster assemblies are arranged along the opposite side of the vehicle and between said opposite side and said cradle assembly.

The cradle assembly comprises first, second, and third elongated plates arranged parallel to one another and parallel to the longitudinal axis of the vehicle. The central plate is bounded by a first fixed and second swingable plate on opposite longitudinal sides thereof. The first fixed plate is inclined and extends upwardly and away from the central plate with its opposite side being positioned toward the side of the vehicle along which the master and slave drive wheel assemblies are arranged. The swingable plate is moveable between a first horizontal position substantially coplanar with the central plate and a second inclined position with its lower end contiguous with the adjacent side of the central plate and with its upper end extending toward the side of the vehicle along which the freewheeling caster assemblies are mounted. The maximum height of the vehicle along the side thereof at which the freewheeling caster assemblies are mounted is equal to the height of the central plate. The height of the vehicle along the side of the vehicle along which the drive wheel assemblies are mounted is greater than the height at the opposite parallel side to accommodate the master and slave drive wheel assemblies and the rotating mechanisms provided for rotating the master and slave drive wheel assemblies about their longitudinal axes transferring from the steer drive mode to the differential drive mode or vice versa. The arrangement of the cradle assembly which supports a paper roll so that its longitudinal axis is substantially parallel to the longitudinal axis of the vehicle enables the vehicle to deliver the roll to a reel stand during the differential drive mode and allows the vehicle to move from a position beneath the delivered roll while still in a differential drive mode and after the swingable plate has been lowered to its first position by providing adequate clearance for withdrawal of the vehicle from the load dispensing position without the need for lifting the delivered roll.

The cradle assembly is slideably mounted upon guide shafts secured to the vehicle frame enabling movement of the cradle assembly, with a load deposited thereon, to provide for either manual or automatic alignment of the cradle assembly with the load receiving reel stand, for example, to assure proper alignment. Locking means are provided for selectively locking the cradle assembly from longitudinal movement; locking the master and slave drive wheel assemblies in the differential drive mode; and for locking the cradle assembly swingable plate in the load retaining or inclined position.

OBJECTS OF THE INVENTION AND BRIEF DESCRIPTION OF THE FIGURES

It is therefore one object of the present invention to provide a novel automatic ground vehicle especially adapted for receiving, carrying, and dispensing large cylindrical shaped loads under control of a remote source.

Still another object of the present invention is to provide a novel vehicle having a cradle assembly for cradling a substantially cylindrical shaped load, said cradle assembly having a swingable plate moveable to a first position to facilitate loading of said load on the vehicle and moveable to a second inclined position to retain the load on the vehicle during the time that the vehicle is being moved.

The above as well as other objects of the present invention will become apparent when reading the accompanying description and drawing on which:

FIG. 5a shows an elevational view of a manual control which can be connected with the vehicle;

DETAILED DESCRIPTION OF THE INVENTION

Figure 4:
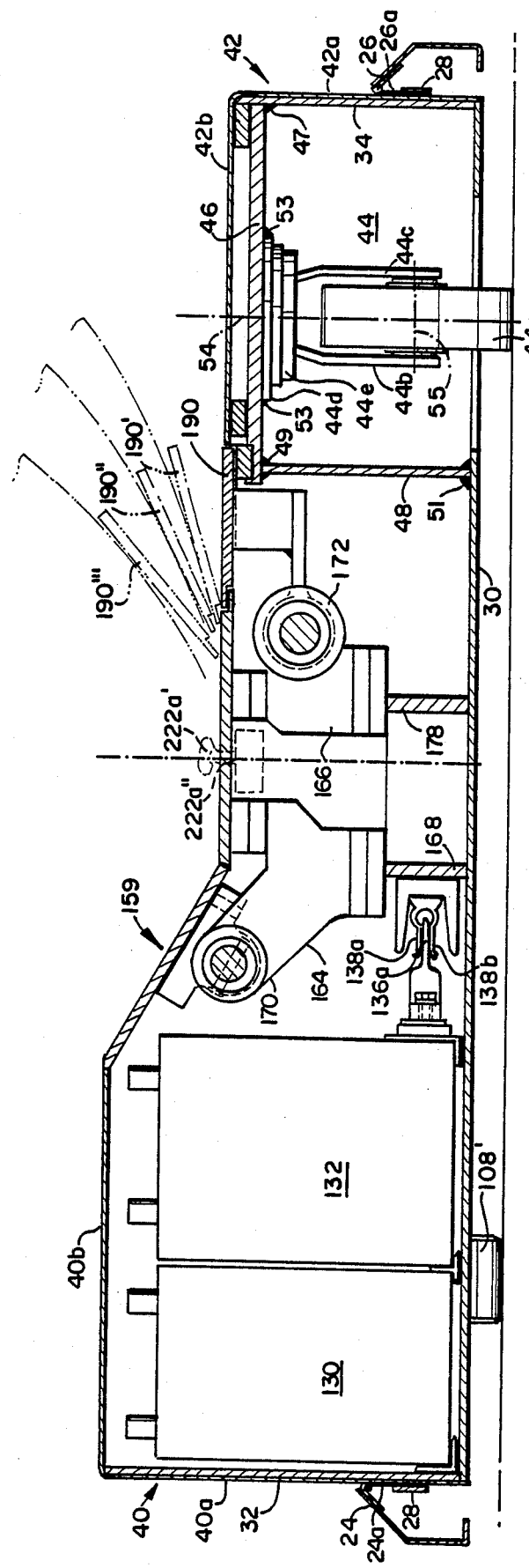
FIG. 4 shows an elevational section of the vehicle looking in the direction of arrows C—C of FIG. 1.
Figure 5:
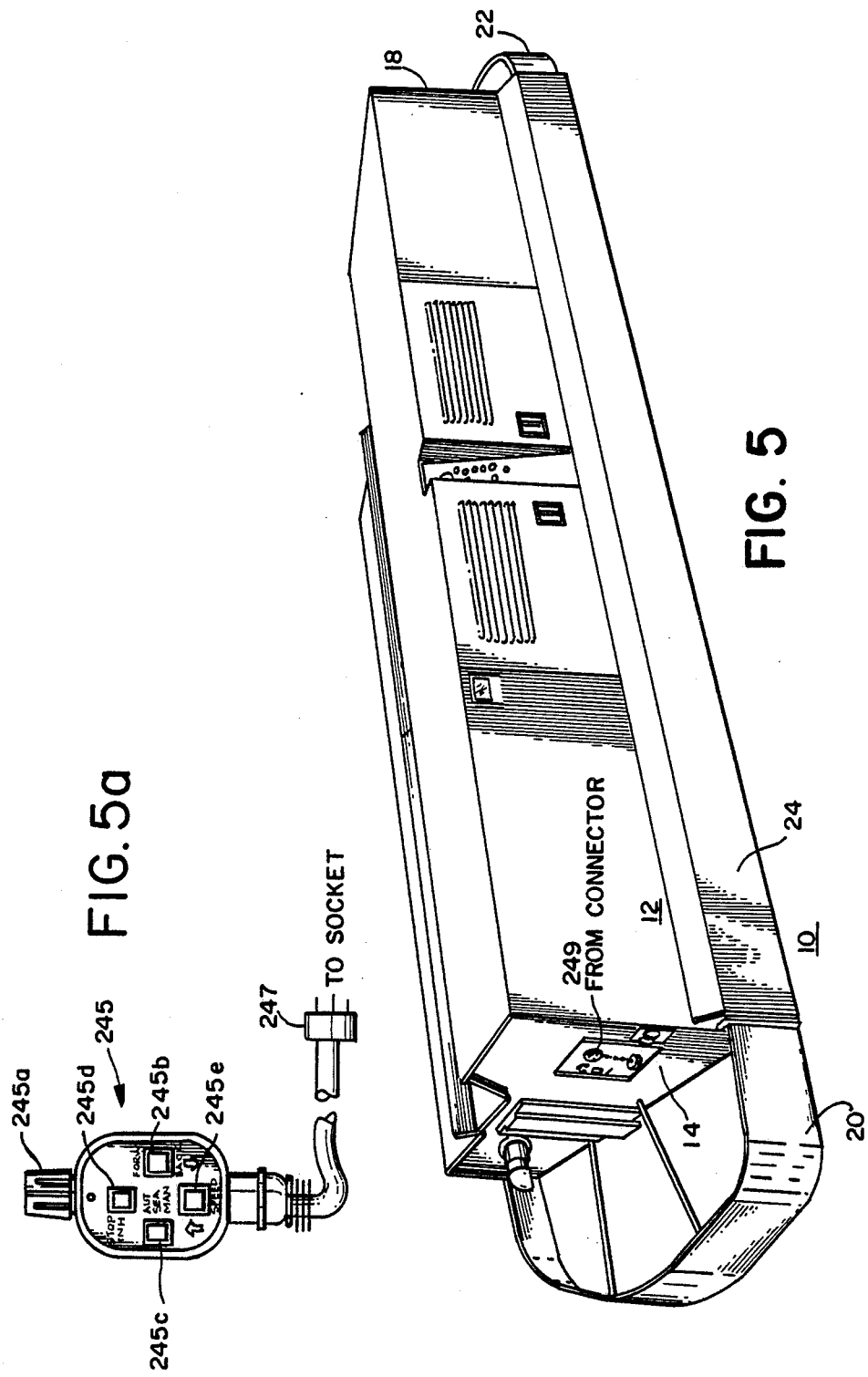
FIG. 5 shows a perspective view of the vehicle of FIG. 1.

FIG. 5 shows a perspective view of the vehicle 10 which comprises a first side wall 12, front wall 14, a second side wall 16 and rear wall 18. Front and rear bumpers 20 and 22 are mounted to front and rear walls 14 and 18 respectively. A side bumper 24 is releasably mounted along side wall 12. A similar bumper 26 (see FIG. 1) is releasably mounted along side wall 16. Noting for example FIG. 4, side bumpers 24 and 26 are hingedly connected to downwardly projecting members 24a, 26a which are slideably inserted into brackets 28 arranged along side walls 16 and 24. Considering FIG. 4 it can be seen that the vehicle 10 comprises a frame including a floor or base plate 30 having structurally supporting vertical side walls 32 and 34 extending upwardly therefrom and suitably welded thereto. Side wall 34 is in actuality two separate side wall structural plates 34a, 34b with their near ends separated by a predetermined distance to provide large gap space therebetween. Similar structural support plates 32a, 32b likewise have their near ends spaced a predetermined distance apart to define opening a similar large gap space therebetween. A pair of structural front and rear end support plates 38 and 39 are welded to base plate 30. The above-mentioned support plates 32, 34, 38 and 39 together with base plate 30, compose a vehicle frame upon which the mechanical and electronic elements of the vehicle 10 are mounted. Side 12 of the vehicle is covered by an L-shaped plate 40 having vertically aligned side wall 40a and horizontally aligned top wall 40b. Cover plate 40 is removable to gain access to the internal components of the vehicle. Cover plate 40 is shown best in FIG. 4.

Similarly, side 16 of the vehicle is covered by a cover plate 42 having vertical side wall portion 42a and horizontal top wall portion 42b. Cover plate assembly 42 is removable in a substantially similar fashion to gain access to the vehicle components housed therebeneath. Cover plate assemblies 40 and 42 may be secured to the vehicle frame by suitable fastening means (not shown). The side bumpers 24 and 26 may be removed either independently of or together with the cover plates 40 and 42.

Figure 1A:
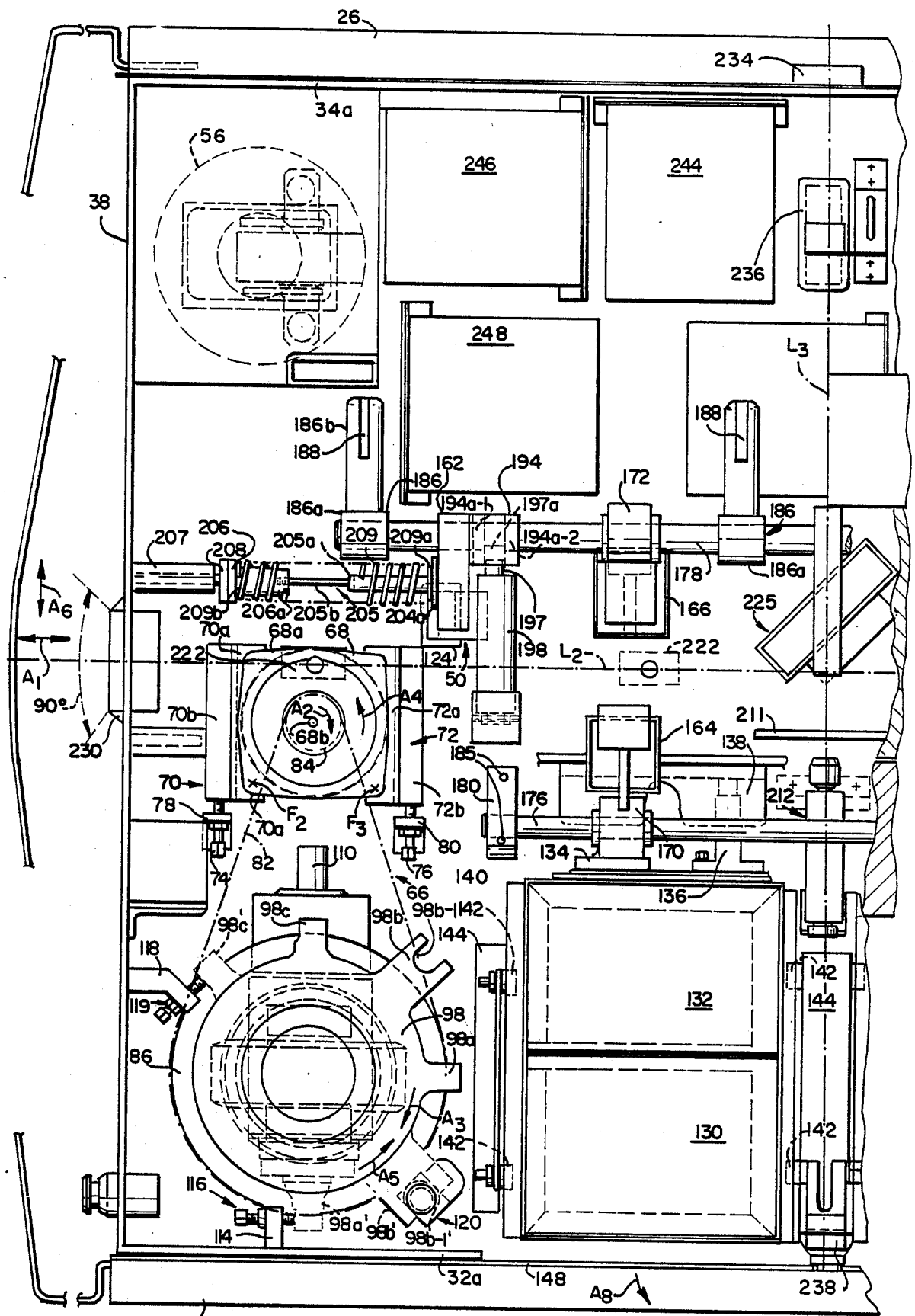
FIGS. 1a and 1b show a top plan view of a vehicle embodying the principles of the present invention.

The caster assembly 44 shown in FIGS. 1 and 4 is rotatably mounted to a support plate 47 welded to side plate 34 at 46 and welded to an additional support plate 48 at 49. The lower end of support plate 48 is welded to base plate 30 at 51. Caster assembly 44 includes a free wheeling roller 44a mounted between brackets 44b, 44c and caster assembly 4 has a mounting plate 44d welded to support plate 46 as shown by weldment 53. A bearing assembly 44e allows support arms 44b, 44c, and hence roller 44a to rotate about a verticle axis of rotation 54. Roller 44a rotates about a horizontal axis of rotation 55. Roller 44a is capable of assuming any angular orientation in the horizontal plane as a result of the movement imparted to the vehicle by the drive wheel assemblies to be more fully described.

Figure 1B:
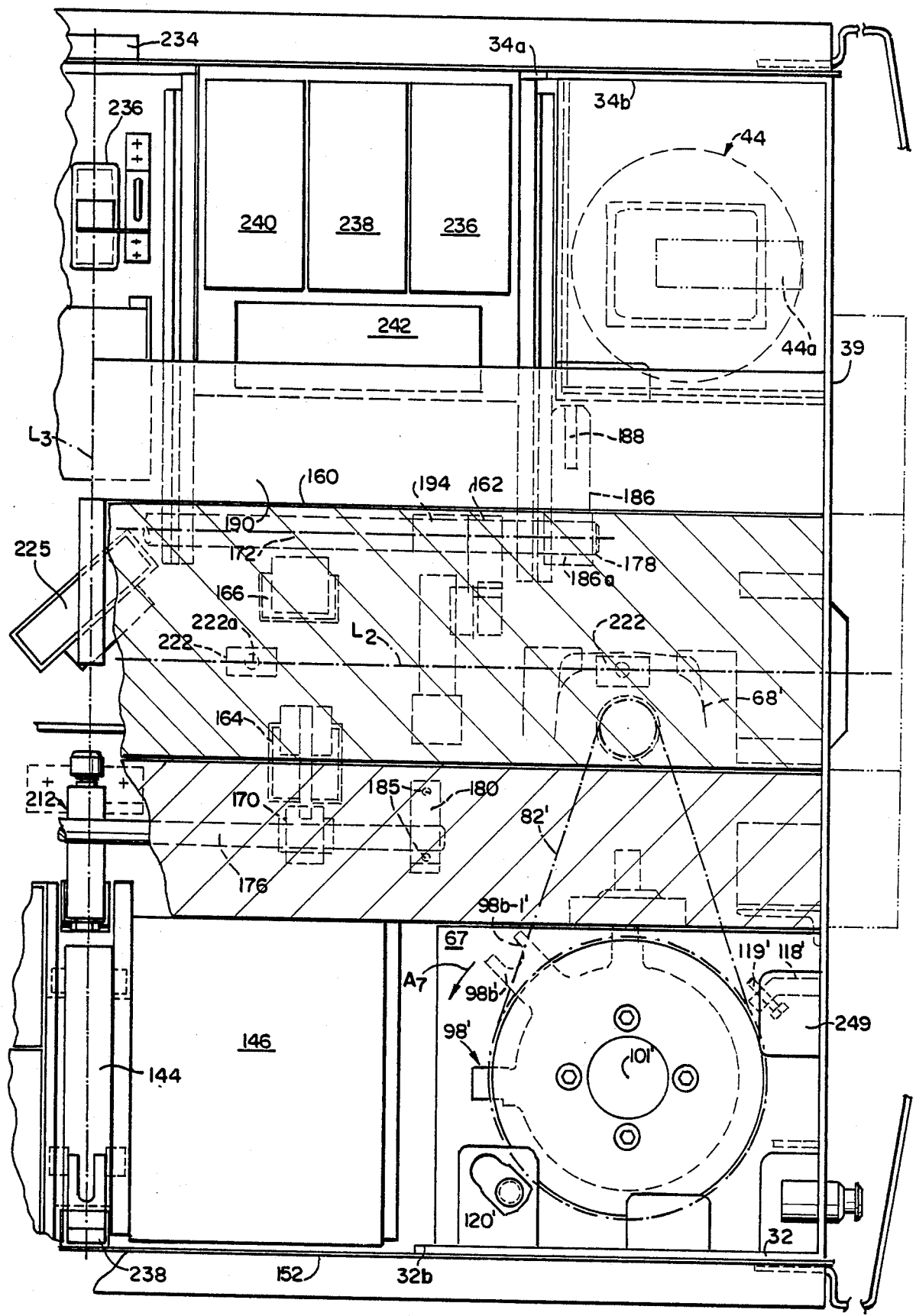
Figure 2:
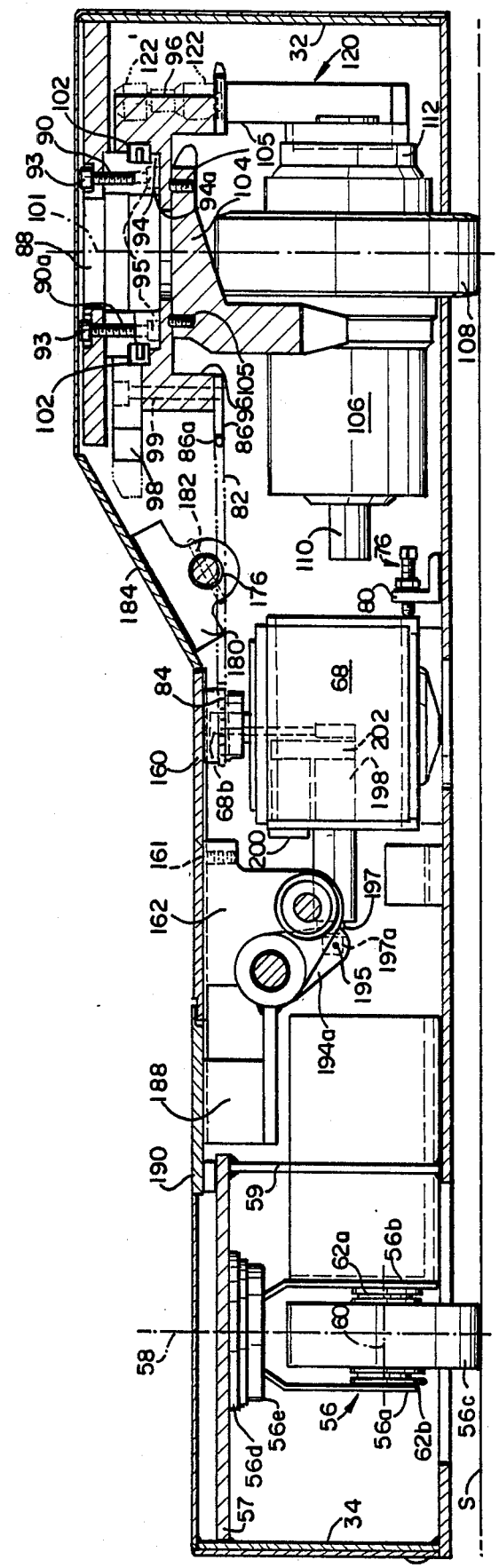
FIG. 2 shows an elevational section of the vehicle looking in the direction of arrows A—A of FIG. 1.

Noting FIGS. 1 and 2, a second caster assembly 56 is provided in the front right corner of the vehicle frame and similarly comprises of a pair of bifurcated arms 56a, 56b rotatably supporting roller 56c. A support plate 57 is welded to side plate 34 and an additional vertically aligned plate 59 is welded thereto. The caster assembly support plate 56d, which bears assembly 56e, enables the bifucated arms 56a, 56b to rotate about an imaginary vertical axis 58. Roller 56c rotates about an imaginary horizontal axis 60. Spring loading means 62a, 62b are provided between the shaft supporting roller 60 and bifucated arms 56a, 56b to bias roller 56c downwardly to assure that roller 56c which engages horizontal surface S is capable of following any bumps or depressions in surface S, thereby assuring that all four rollers of the vehicle 10 engage the surface S to provide the vehicle with additional stability.

Master and slave drive wheel assemblies 66 and 67 are provided in the front left and rear left portions of the vehicle frame and are utilized to impart movement to the vehicle; caster assemblies 44 and 56 being provided to merely follow this movement and provide the vehicle with rolling engagement along side 16 of the vehicle.

Since the mechanical components of the master and slave drive wheel assemblies are substantially identical in design and function, only the master assembly 66 will be described herein for purposes of simplicity.

The master drive wheel assembly 66 is driven by a motor 68 mounted on base 30 by a pair of brackets 70, 72. The base plate 68a of motor 68 is secured to flanges 70a, 72a of brackets 70, 72 by suitable fastening means arranged at positions F1, F2, F3 and F4 respectively. Bracket portions 70b, 72b are slideably mounted to vehicle base plate 30 and are adjustable by threaded adjustment assemblies 74, 76 threadedly engaging a tapped aperture in L-shaped brackets 78, 80 and engaging the ends of portions 70b, 72b to position motor 68 to maintain the drive chain 82 taut. The output shaft 68b of motor 68 drives a sprocket 84. Drive chain 82 is entrained about sprocket 84 and a sprocket 86 shown in FIGS. 1 and 2. A top supporting plate 88 is welded to structural support plate 32. An upper bearing retainer 90 having a substantially ring-shaped configuration defining a central opening 90a is rigidly secured to frame 88 by a plurality of fastening members 93 threadedly engaging tapped openings in upper bearing retainer 90.

A ring shaped lower bearing retainer 94 is secured to upper bearing retainer 92 by suitable threaded fastening members 95 threadedly engaging tapped aperatures in upper bearing retainer 90. The ring shaped lower bearing retainer 94 defines a central opening 94a.

Sprocket 86 is substantially ring-shaped, having teeth 86a about its outer periphery and having an inner periphery defining a large central opening 86b. Sprocket 86 is secured to a generally annular-shaped plate 96 which is secured to a stop plate 98 by fasteners 99. Sprocket 86, plate 96, and stop plate 98 are adapted to rotate about an imaginary vertical axis 101. Annular shaped plate 96 and stop plate 98 are freewheelingly rotatably mounted by thrust bearings 102 which are arranged between upper and lower bearing retainers 90 and 94.

A wheel suspension assembly 104, forming part of the forward drive wheel assembly 66, is secured to plate 96 by threaded fasteners 105 and supports a motor 106 which imparts rotation to master drive roller 108 through a planetary gear assembly mechanically arranged between the output of motor 106 and wheel 108. The master and slave drive wheel assemblies are Type 21.26 motor and wheel drives manufactured by Schabmuller and will therefore not be described herein in detail. However, it is sufficient to understand that this type drive wheel assembly comprises a motor 106 for driving wheel 108 by use of a planetary gear assembly arranged between the output of motor 106 and wheel 108; and further comprises a brake assembly 112 for abruptly halting the rotation of wheel 108; and a tachometer 110 for tracking the rotational speed of wheel 108.

Stop plate 98 also forming part of the forward drive wheel assembly 66 is provided with projections 98a and 98b, projection 98b having a semi-circular slot 98b-1 provided therein. The stop plate 114 welded to structural side plate 32 is provided with threaded fastening means 116 for engagement with projection 98a, as will be more fully described.

A second stop plate 118 is welded to structural front plate 38 and is provided with fastening means 119 for selective engagement with projection 98c as will be more fully described.

The operation of master drive wheel assembly 66 is as follows:

When it is desired to move vehicle 10 in the forward steer drive direction as represented by arrow A1 in FIG. 1, wheel 108 is oriented in the position shown in FIG. 2. If it is desired to turn vehicle 10 toward the right, motor 68 rotates sprocket 84 clockwise in the direction shown by arrow A2 in FIG. 1 causing drive chain 82 to rotate stop plate 98, flange 96, and sprocket 86 in the clockwise direction as shown by arrow A3.

In order to execute a left hand turn with the vehicle 10 moving forward, motor 68 rotates sprocket 84 in the counterclockwise direction as shown by arrow A4 causing drive chain 82 to rotate sprocket 86 in the counterclockwise direction as shown by arrow A5 causing wheel 108 to rotate in the same direction about a vertical axis 101. The amount of rotation in the counterclockwise direction A5 is limited by stop plate 118 and adjustable assembly 119 which is engaged by stop plate 98c when it occupies the dotted line position $98c^1$ of FIG. 1 preventing any further movement in the counterclockwise direction. This is preferably an angle of 45° relative to solid line position 98c.

The wheel 108 may be rotated in the clockwise direction shown by arrow A3 through a maximum angle of 90° whereupon further movement in the clockwise direction is limited due to engagement of projection 98a with adjustable assembly 116, when projection 98a occupies the dotted line position $98a^1$.

When stop plate 98a engages adjustable assembly 116, the semi-circular recess 98b-1 is positioned immediately above the head 122 of a locking assembly 120 when projection 98b occupies the dotted line position $98b^1$ shown in FIG. 1. Master (i.e. forward) drive wheel assembly 66 is moved to the last mentioned position when it is desired to move vehicle 10 in the differential drive direction as represented by arrow A6 shown in FIG. 1.

When operating in the differential drive mode, the master and slave drive wheel assemblies 66 and $66^1$ are locked in the differential drive mode position by their respective locking assemblies 120, $120^1$. It should be noted that stop plate 98 of master drive wheel assembly 66 is rotated clockwise to place the wheel assembly in the differential drive mode whereas stop plate $98^1$ of slave drive wheel assembly 67 is rotated counterclockwise as shown by arrow A7 to move and lock the slave drive wheel assembly in the differential drive mode.

The locking assembly 120 may, for example, be a miniactuator model No. 9307-103-022 manufactured by Warner Electric and will not be described in detail herein for purposes of simplicity. For purposes of understanding the present invention, the actuator is comprised of a d.c. motor, gear train and acme screw assembly coupled to head 122 for moving the head 122 from the solid line position shown in FIG. 2 to the dotted line position $122^1$ where head $122^1$ extends into recess $98b\text{-}1^1$ to prevent movement of the stop plate 98 and hence the master drive wheel assembly 66 so long as head $122^1$ extends into slot $98b\text{-}1^1$.

When the drive wheel assembly is in the steer drive mode, i.e. with wheel 108 generally in the position shown in dotted line fashion in FIG. 1, electronic circuitry to be more fully described provides the desired drive signals to motor 68 under control of an antenna 124 mounted to the base plate 30 of the vehicle frame and having its central axis colinear with the longitudinal axis L2 of vehicle 10 as shown in FIG. 1. Antenna assembly 124 may be a CRA automatic guidance antenna produced by NDC Company of Charlotte, N.C. and will therefor not be described herein in detail. It is sufficient for purposes of the present invention to understand that the antenna assembly 124 comprises cf first and second coils spaced apart equally from imaginary center line L2 and is adapted to detect the magnetic field from a pilot line or wire sensing both the offset position of the antenna from the pilot line and the frequency of the magnetic field. This information is transmitted to the automatic carrier controller to be more fully described, which converts the offset position signal into steering signals. The frequency of the detected signal is utilized to generate a command such as for example a command to operate at either slow or high speed. A similar receiving antenna 126, associated with slave drive wheel assembly $66^1$ and operates in a similar manner to control the rotation of the slave drive wheel about its vertical axis $101^1$.

In operation, when the pilot wire is colinear with the axis L2 of vehicle 10 and hence of antenna 124, the signals developed by the spaced coils within the receiver antenna exactly balance one another so that no adjustment in the steering signal is provided to front wheel 108. In the event that the pilot line is displaced to one side or the other of the longitudinal center line L2, the magnetic fields sensed by the windings of antenna 124 will be out of phase causing an offset position signal to be provided to the automatic carrier controller circuit to be more fully described hereinbelow to generate steering signals for rotating wheel 108 about its longitudinal axis 101 in a direction determined by the offset signal which in turn is determined by the direction which the pilot line is displaced from the longitudinal axis L2. The slave drive wheel assembly $66^1$ operates in substantially the same fashion.

Vehicle 10 is powered by a d.c. source which, in one preferred embodiment, comprises first and second six volt batteries 130, 132 of the wet cell type. Although not shown for purposes of simplicity, batteries 130 and 132 are connected in electrical series to provide a 12 volt output. The 12 volt output is coupled through electrical terminals 134, 136 to a terminal connecting block 138. The free ends of terminals 134 and 136 have blade like ends as shown by terminal 136a in FIG. 4 which slideably moves between a pair of resilient conductive members 138a, 138b forming a part of terminal block 138. Similar conductors are provided for electrically engaging the blade like end of terminal 134.

Batteries 130 and 132 are mounted upon a support plate 140 which is adapted to be slideably moved upon rollers 142 arranged along opposite sides of batteries 130 and 132 and rollingly supporting slideable plate 140. The rollers 142 are rotatably mounted in a free wheeling fashion upon support brackets 144 and 146. A swingably mounted door 148 may be swung in the direction shown by arrow A8 to gain access to batteries 130 and 132 by sliding plate 140 and hence batteries 130, 132 outwardly from their operative position. Removal of the batteries further causes the batteries, terminals 134, 136 to be disengaged from the cooperating connecting terminals. The connecting terminals are electrically connected to the control electronics of the system by suitable electrical conductors not shown for purposes of simplicity. A second slideable plate 146 supports the third and fourth d.c. batteries arranged to one side of batteries 130, 132 (not shown for purposes of simplicity) and which may be slideably removed from their operative position through swingable door 152. It should be understood that the batteries arranged on slideable plate 146 are similarly connected in electrical series and are provided with terminals similar to terminals 134 and 136 for selective engagement with a terminal connecting block similar to block 138. The terminals of the second connector block are preferably connected in electrical parallel with the terminals of connecting block 138 to provide 12 volt d.c. power for the vehicle. It should be understood that a larger or smaller number of batteries may be utilized and that batteries of different voltage capacities may be employed if desired.

The vehicle 10 is provided with a cradle assembly 159 which is arranged substantially intermediate with the vehicle sides 12 and 16 and comprises an elongated center plate 160 secured to a plurality of support brackets forming part of the vehicle frame by fastening means 161. The mounting arrangement comprises, as shown in FIG. 4, brackets 164, 166 which are welded to vertical support members 168, 170 which in turn are welded to the base plate 30. These brackets are provided with bushings 170, $170^1$, 172, $172^1$ shown in FIGS. 1 and 4 for supporting elongated shafts 176, 178. Shaft 176 is freely slideable within the bushings 170, $170^1$. The free ends of shaft 176 extend into openings in brackets 180, 180. A pin 182 (see FIG. 2) extends through each bracket 180 and through shaft 176 locking shaft 176 to each of the brackets 180. A second elongated plate 184 is secured to the brackets 180 by suitable fastening means at locations 185.

In a similar fashion, shaft 178 is freely slideably along its longitudinal axis within the bushings 172, $172^1$ in brackets 166.

A plurality of brackets 186 each have their bushings 186a receiving shaft 178. Each of the bushings 186a has an arm 186b integral with bushing 186a and is further provided with a plate 188 arranged at right angles to arm 186b and secured thereto by welding.

Figure 3:
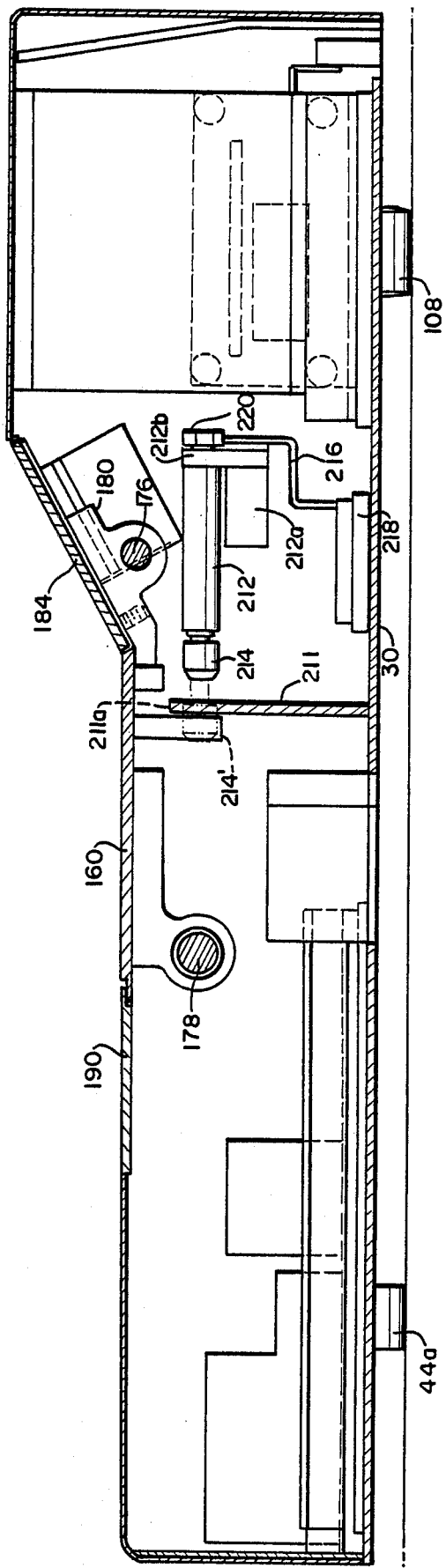
FIG. 3 shows an elevational section of the vehicle looking in the direction of arrows B—B of FIG. 1.

A elongated plate 190 is fastened to plates 188 by suitable fastening means and is swingable between a first position shown in solid line fashion for example in FIGS. 2 and 3 to any one of three dotted line positions $190^1$, $190^{11}$ and $190^{111}$ shown in FIG. 4. Elongated plate 190 cooperates with elongated plates 160 and 184 to form a cradle assembly 159 which cradles a cylindrical shaped load as can best be understood from a consideration of FIG. 4. For example, the vehicle 10 is especially adapted for carrying large paper rolls of lengths of up to 5 feet and having diameters typically equal to 27 inches, 36 inches and 45 inches respectively. Paper rolls of this nature weigh on the order of 2000 pounds or more. By tilting plate 190 to the appropriate angle, as shown by the dotted line positions 190$^I$, 190$^{II}$ and 190$^{III}$, the cradle assembly 159 holds the paper roll against movement.

A pair of collars 194 are arranged along shaft 178 and are secured thereto against any rotational or longitudinal movement. Each collar 194 is provided with a lever 194a shown best in FIG. 2. Lever 194a comprises a pair of bifurcated arms 194a-1 and 194a-2 which receive a pin 195 (see FIG. 2) which extends through the free end 197a of an elongated threaded member 197 forming part of an acme screw assembly 198. Lever 194a rotates shaft 178 and hence brackets 186 and plate 190 by means of a drive assembly comprising d.c. motor 200, gear train 202 and acme screw 198. Two such drive assemblies are provided near opposing ends of shaft 178 and operate in unison to swing the plate 190 upwardly and downwardly, depending upon the operation desired.

A pair of brackets 162, 162$^1$ are mounted upon shaft 178 which extends through bushings provided in said brackets, said brackets being rigidly secured to shaft 178. Each of the brackets 162, 162$^1$ is provided with a bearing surface against which the base member 204a of a stop sleeve 204 rests. Stop sleeve 204 is hollow and receives the head 205a and body 205b of an elongated pin 205 threadedly secured to a spring base 206 which in turn is secured to structural side wall 38 by means of supporting plate 207. An elongated helical spring 209 is arranged so that the projecting portion 206a of spring base 206, stop sleeve 204 and pin 205 extend through the hollow interior of the helical spring 209 such that the right hand end 209a of helical spring 209 rests against base 204a while the left hand end 209b rests against base portion 206. The spring biasing assemblies each comprising springs 209, 209$^1$ are substantially identical to one another and each act to urge its associated bracket 162, 162$^1$ in opposing directions thereby substantially centering the brackets 162, 162$^1$ and hence the shaft 178 and the plates 160, 184 and 190 secured thereto. This arrangement allows the cradle assembly 159 to be moved along the longitudinal axis $L_2$ either forwardly or rearwardly as shown by arrow A1 in FIG. 1.

A locking assembly 212 is provided for preventing the cradle assembly 159 from experiencing any longitudinal movement as the vehicle 10 transports the load. Locking assembly 212 cooperates with a fixed plate 211 welded to base plate 30 as can best be seen in FIG. 3. The locking assembly 212 comprises a d.c. motor 212a, a gear train 212b and a acme screw 212c capable of reciprocating head member 214 from the solid line position shown in FIG. 3 to the dotted line position 214$^1$ where it extends through an opening 211a in fixed plate 211. Locking assembly 212 is secured to the base plate 30 of vehicle 10 by a bracket 216 secured to base plate 30 by a support plate 218 and secured to the locking assembly 212 by fastening means 220. Locking assembly 212 is located intermediate the forward and rearward ends of vehicle 10 and automatically locks the vehicle cradle assembly 159 when a load is deposited thereon as detected by a plurality of sensors 222 each being mounted at predetermined intervals along the longitudinal axis $L_2$ of vehicle 10 and on the underside of plate 160. Each sensor 222 is provided with a movable spring biased button or sensing element 222a which projects upwardly through an opening in plate 160 and occupies dotted line position 222a$^1$ shown in FIG. 4 when there is no load on the cradle assembly of vehicle 10. Four such sensors are preferably provided to detect the presence of a full-length, half-length or quarter-length cylindrical load (i.e. paper roll) as well as detecting the longitudinal position of the load upon the cradle assembly 159. The sensor buttons 222a are urged downwardly to the dotted line position 222a$^{11}$ shown in FIG. 4 to indicate the presence of a load and thereby cause the locking assembly 212 to lift swingable plate 190 and lock the cradle assembly against longitudinal movement and thereby enable movement of vehicle 10 to the next location without displacement of the load.

The vehicle 10 is adapted to transmit data representing its status in a repetitive fashion as will be more fully described. To accomplish this, vehicle 10 is provided with a transmitting antenna 225 mounted at a 45° angle to the longitudinal axis $L_2$ and the central lateral axis $L_3$. This arrangement enables the vehicle to transmit to receiving wires which may be arranged either perpendicular or parallel to the vehicle longitudinal axis $L_2$.

The vehicle 10 may be manually halted whenever desired by pressing one of the manual pushbuttons 241, 243 arranged along the front and rear ends of vehicle 10 shown in FIG. 1. Vehicle 10 may be moved by manual control 245 having steering potentiometer 245a, forward-rearward slide switch 245b; mode selection switch 245c, stop button 245d and speed selection switch 245e and having a male plug 247 removably connectible with a socket 249 arranged, for example, along the rear end of vehicle 10, as shown in FIGS. 5 and 5a. The manual control 245 may be the model MCD manual control manufactured and sold by NDC.

An ultrasonic sensor 230 is arranged at the forward end of vehicle 10 and senses the presence of obstructions which lie within an angular range of 90° in the horizontal plane and a of approximately 70 ° in the vertical plane measured upwardly from the horizontal plane. The ultrasonic sensor 230 transmits an ultrasonic signal. If this signal is intercepted by an obstruction within the range of sensor 230, the signal is reflected back to ultrasonic sensor 230 causing the vehicle 10 to drop to its low speed as it moves.

A light sensor 234 is arranged along the side plate 34 of vehicle 10 and is utilized to stop the vehicle when it senses light of a predetermined wavelength. For example, in the preferred embodiment, sensor 234 is sensitive to modulated infrared radiation in order to halt the vehicle as it undergoes movement in the steer drive direction or in the differential drive direction, in a manner to be more fully described.

Vehicle 10 utilizes receiving antennas 236 and 238 arranged along with their longitudinal axes colinear with the lateral axis $L_3$ of vehicle 10 for movement in the differential drive direction shown by arrow A6 in FIG. 1. These receiving antennas are utilized during side wise or differential drive movement to control stopping and starting of vehicle 10 and are further utilized during longitudinal or steer drive movement to seek cross-wires providing further control signals to the vehicle.

The electronics for vehicle 10 are mounted on board the vehicle and, in the preferred embodiment, includes housings 236, 238, and 240; the electronics for controlling the differential drive are arranged within housing 236, and the steer drive activities are arranged within housings 238 and 240.

The electronics arranged within these housings are manufactured and sold by NDC and will therefore not be described herein in detail but are programmable controllers or microprocessors which receive input signals from the antenna, and manual control (to be more fully described). The stop switch, release switch, and emergency stop switch couple signals to the drive and steering motor devices of the drive wheel assemblies 66 and 67 in a manner to be more fully descried.

Additional outputs may be provided to relays and other like devices arranged with housing 242 shown in FIG. 1b for controlling other functions on the vehicle.

Housings 244, 246, and 248 maintain servo amplifiers for controlling the d.c. motors provided on vehicle 10. The servo amplifiers provided within housings 244 and 246 receive tachometer feed back from the tachometers 110, $110^1$ provided as an integral part of each of the drive motor assemblies 66 and 67.

Figure 6:
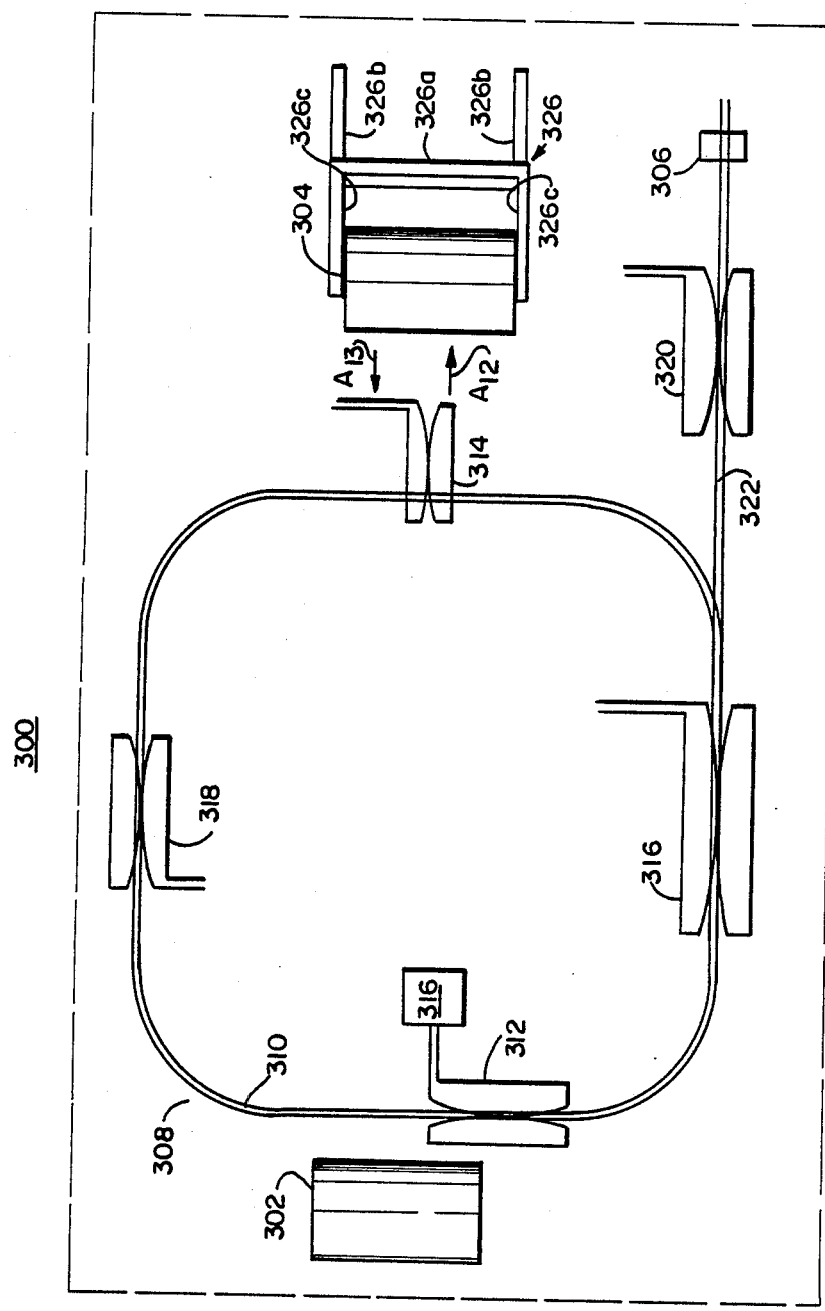
FIG. 6 shows a simplified floor layout in which the vehicle of FIG. 1 may be employed.

FIG. 6 shows a simplified arrangement for an application in which the vehicle 10 of FIG. 1 may be used to great advantage. The layout 300 shown in FIG. 6 comprises a loading location 302, a load receiving station 304 and a battery charging station 306. A track arrangement 308 is provided for guiding the vehicle and includes at least one wire 310 imbedded in the floor and coupled through suitable means to a frequency source for generating an a.c. signal of a predetermined frequency which is typically in the kilocycle range for example in the range from a fraction of a kilocycle to several kilocycles.

The forward receiving antenna 124 mounted on vehicle 10 and shown in FIG. 1 follows this signal and straddles wire 310. In order to cause the vehicle to stop, intersecting loops such as for example intersecting loops 312 and 314 are provided. Intersecting loop 312 is coupled to a frequency source 316 which may be arranged at a location remote from that shown in FIG. 6 so as to be removed from the working region to avoid any conflict with work activities. Receipt of a signal of a second predetermined frequency can for example cause vehicle 10 to stop, back up or move sideways. This is helpful in the present application in order to position the vehicle to receive a cylindrical shaped load, such as a paper roll, at the loading station 302. For purposes of simplification of the present invention the cylindrical load may be manually, semi-automatically, or fully automatically placed upon vehicle 10.

As soon as the load is placed upon vehicle 10 the buttons 222a of at least one of the sensors 222 shown in FIG. 1 will be activated whereby a signal is applied to the electronics causing the driving mechanism shown in FIG. 2 including motor 200, gear train 202 and acme screw 198 to lift swingable plate 190 to that dotted line position shown in FIG. 4 which corresponds to the diameter of the load received by the vehicle 10. The angular position may be present or may be selected in accordance with a control signal of a predetermined frequency causing the motor to be operated for a time interval determined by the control signal.

The loops 316, 318 and 320 are provided for transmission from vehicle 10 to a remote control center (not shown for purposes of simplicity) conductively coupled to each of the loops. As was described hereinabove in connection with FIG. 1, transmitting antenna 225 derives signals from one of the electronic circuits arranged in housing 236, 238, and 240 for advising the remote control center of the status of the vehicle. The information is transmitted as a series of eight bits of binary information, the first five bits representing the vehicle identification code and the remaining three bits representing status such as traveling speed, carrying a load (or empty), and direction of movement. The transmitter 225 may for example be the type produced by NDC and will therefore not be described in detail for purposes of simplicity.

The receivers, such as receiver 124, receive the transmitted signal (or signals) and convert the signals to binary form for controlling operations on vehicle 10 such as, for example, lifting swingable plate 190, operating the various locking assemblies to lock the cradle assembly 159 against longitudinal movement, to lock the swingable plate 190 in the upper position; and to lock the drive wheel assemblies in the differential drive position.

Monitoring means are also provided for monitoring the condition of the batteries 130, 132 and the like. When the storage capacity of the batteries fall below a predetermined level, a signal is transmitted by the vehicle transmitter 225 to indicate this condition allowing the signal generated in wire 310 to be terminated and initiating the generation of the signal in wire 322, which is preferably generated when the vehicle is passing through the region of loop 316, to cause the vehicle to follow path 322. The transmission of vehicle 10 through transmitting antenna 225 provides an indication of the location of vehicle 10 as it passes through loop 320 toward battery charging station 306.

Assuming that the batteries contain a normal charge, and that a load has been received at station 302, the vehicle will follow the signal generated in wire 310 and travel toward location 304. The vehicle is halted as it passes through loop 314 by receipt of a control signal developed therein through the control center. The vehicle is then controlled to rotate the drive wheel assemblies through a 90° angle so that the drive wheels 108 and $108^1$ are in alignment with the differential drive direction. The side of vehicle 10 along which the drive wheels 108, $108^1$ are mounted is arranged remote from the load receiving station 304, which typically comprises a reel stand 326. The reel stand 326 is shown in simplified form in FIG. 6 and comprises a central support 326a about which three pairs of arms are arranged at 120° intervals. Two such pairs 326b and 326c are shown in FIG. 6. Typically one pair of arms contains a paper roll which is presently unwound and fed into the press; a second roll which is in a position in readiness for being unwound and fed to the press; and a third pair of arms (not shown in FIG. 6) containing a core of a paper roll which has just been totally dispensed to the press and is ready to receive a fresh paper roll.

The vehicle 10 is moved in the differential drive direction as shown by arrow A12 in FIG. 6 and is positioned beneath the 326c to dispense a paper roll such as shown at position 304 thereto. When the vehicle is properly positioned by means to be more fully described, the spindles (not shown) at the free ends of arms 326c are extended into the hollow core of the paper roll and the upper roll is lifted a predetermined distance from the vehicle. This lifting is sufficient to enable those sensors 222 which have been downwardly depressed by the load previously deposited thereon to be moved to the upper position $222a^1$ shown in FIG. 4 indicating that the load has been removed. This condition is monitored by the control electronics which initially operates the unlocking assembly to unlock the swingable arm 190 from the locked position and operate the drive motor 200 shown in FIG. 2 to lower the swingable plate to the solid line position 190 shown in FIG. 4. In this condition, the vehicle is now able to move in the direction shown by arrow A13 in FIG. 6 so as to be withdrawn from the load receiving position beneath paper roll 304 and return to a position where vehicle 10 straddles wire 310, enabling the vehicle to return to the loading position 302.

When the vehicle is moved to the position beneath the arms 326c of reel stand 326 to dispense a paper roll, the locking mechanism which locks the cradle assembly against longitudinal movement is operated to the unlocked position enabling the cradle assembly to be moved longitudinally to facilitate alignment of the paper roll between the arms 326c of reel stand 326. In this condition, the cradle assembly may be moved either manually or automatically by provision of a drive mechanism similar to the driving mechanism which includes motor 200, gear train 202 and acme screw 198. Such an assembly may be positioned to bear against bracket 162, for example immediately adjacent to the spring 209 and in the position above the location where spring 209 bears against plate 162 and beneath elongated plate 160. The drive signal may be derived from the system electronics.

As the vehicle 10 returns from the position 304 toward the position 302 it passes through loop 318 which receives the transmission from vehicle 10 indicating the present status of the vehicle, which may, for example, indicate that the vehicle is returning to the location 302 at high speed, that it has no load and that its battery capacity is adequate. The vehicle typically transmits continuously in a repetitive fashion rather than transmission on demand. However any other type of transmission technique may be employed, if desired.

Figure 10:
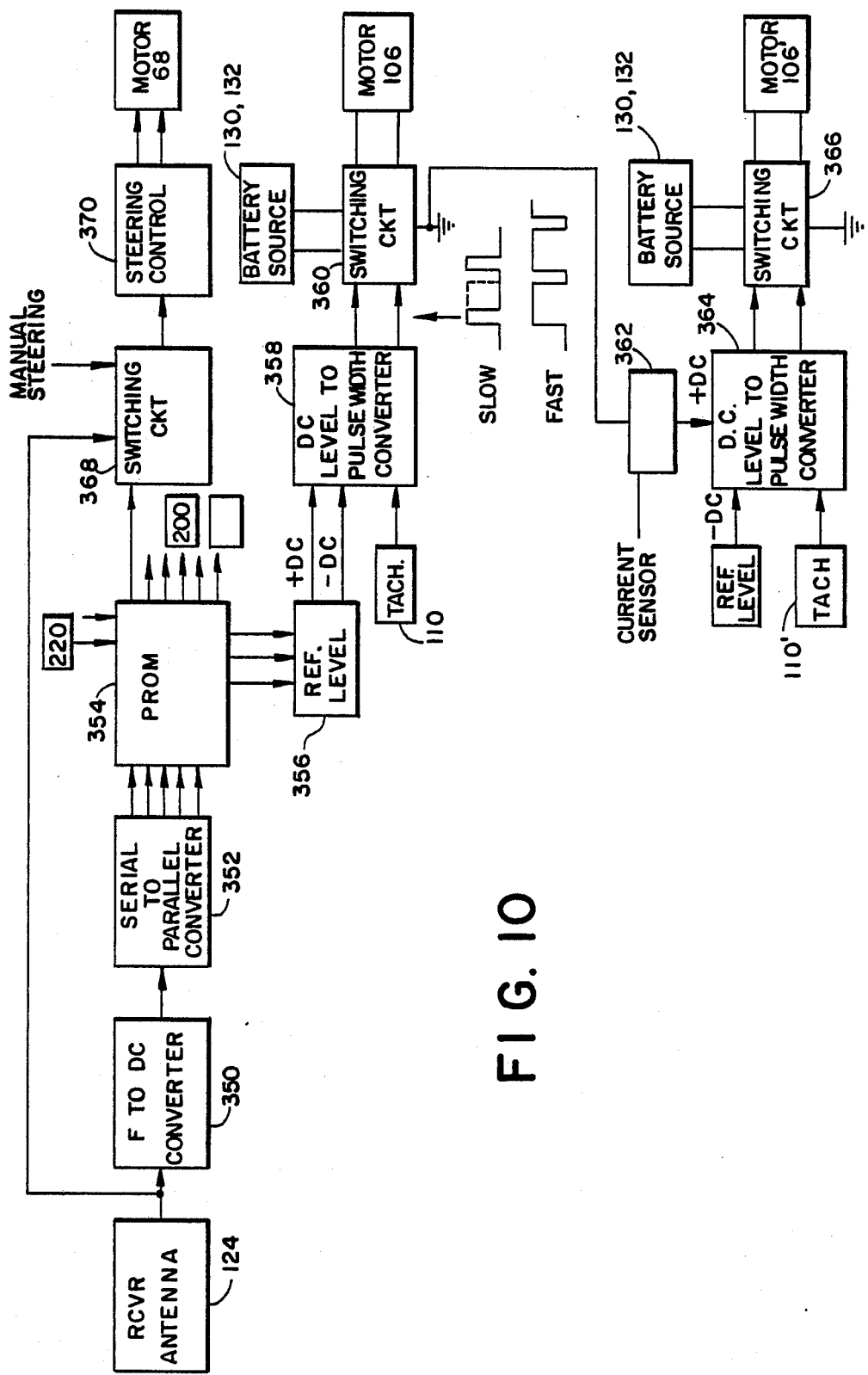
FIG. 10 shows a simplified block diagram showing the electronic circuits employed in the vehicle of FIG. 1.

As shown in FIG. 10, the forward receiving antenna 124 (see FIG. 1) receives the incoming signal and converts the received frequency to d.c. level at 350. The d.c. level is converted at 352 to digital form with the digital output being applied in parallel to a memory 354 which contains binary data at its storage locations and which data are called out in accordance with the input applied to the memory. Selected ones of these outputs are coupled at reference level circuit 356 from memory 354 for developing either a plus d.c. level or minus d.c. level depending upon whether the vehicle is to be propelled in the forward or reverse direction. A level-to-pulse-width converter 358 converts the d.c. level into a series of pulses whose pulse width is a function of the particular d.c. input level. For example, typical pulse waveforms for operating the vehicle at slow speed and at fast speed are shown adjacent the level to pulse width converter 358. The level of pulse width converter 358 operates switching circuit 360 which coupes the battery sources 130, 132, etc. to the motor through switching circuit 360 in the proper polarity dependent upon whether the vehicle is to be moved in the forward (plus d.c.) or rearward (minus d.c.) direction. The time duration during which the battery source is coupled to motor 106 through switching circuit 360 is determined by the width of the pulses developed by converter 358. The motor speed is a function of the pulse width.

In the preferred embodiment, the drive wheel assembly 67 is operated as a slave to drive wheel assembly 66 as opposed to separately and independently deriving the speed frequency signal from the wire such as wire 310 of FIG. 6, for example. The signal is derived from a current sensor 362 coupled to switching circuit 360 for developing the forward drive signal which is coupled to a second level-to-pulse-width converter 364 utilized to drive the motor $106^1$ for the rear drive wheel assembly 67. The pulse width converter 364 is coupled to a second switching circuit 366 which selectively couples battery source 130, 132 to motor $106^1$ through switching circuit 366 for a period dependent upon the pulse width of the pulses generated by converter 364 and have a polarity dependent upon whether the vehicle 10 is being propelled in the forward or rearward direction.

The outputs of tachometers 110 and $110^1$ are also applied to converters 358 and $358^1$ respectively and these signals are compared, typically through a signal comparator to determine whether the motor operating speed has been achieved.

Slaving the rearward drive wheel assembly 67 to the forward drive wheel assembly 66 assures that any loading of the forward drive wheel assembly for whatever reason is always reflected in the rearward drive wheel assembly whereas deriving a speed control signal independently for the forward and rearward drive wheel assemblies by way of the forward and rearward receiving antennas 124 and 126 (see FIG. 1) cannot provide this unique arrangement.

Receiver antenna 124 also controls steering by providing for control by generating phase displacement signals from the transmitting wire which phase displaced signals are developed as a result of departure of the longitudinal axis of the vehicle 10 and hence antenna 124 from the portion of the transmitting wire over which the vehicle is presently passing. These phase displacement signals are coupled through a switching circuit 368 to a steer control circuit 370 which drives motor 68 in the proper direction according to the detected phase displacement in order to bring the vehicle back to the condition where it straddles the transmitting wire. Switching circuit 368 selectively couples the steer control circuit 370 to either a manual steering input or the output of the receiver antenna 124 for controlling motor 68, under control of the manual control unit 249.

The rear drive wheel assembly 67 operates in a substantially identical fashion and independently causes the rear of the vehicle, through operation of motor $68^1$, to straddle the transmitting wire and thereby properly steer the rear of the vehicle in the same manner in which the forward end of the vehicle is steered.

The memories receive other inputs such as the outputs of sensors 220 and provide other outputs for controlling the operation of the various locking assemblies such as for example the assembly for locking the cradle from experiencing longitudinal movement; the locking assembly for locking the swingable plate 190 in its upper position, and so forth. These outputs are typically coupled to the motor drives for these devices such as for example the motor 200, motor 212c, and so forth. Preferably, separate memories are provided for controlling these on-board functions although a single memory of appropriate storage capability may be employed, if desired.

The memory devices are arranged within housing 236 through, for example, 240 while the switching circuits, reference level circuits 356 and converter circuits 358 and 364 and the like are preferably arranged within one of the housings 244, 246, and 248.

Figure 7:
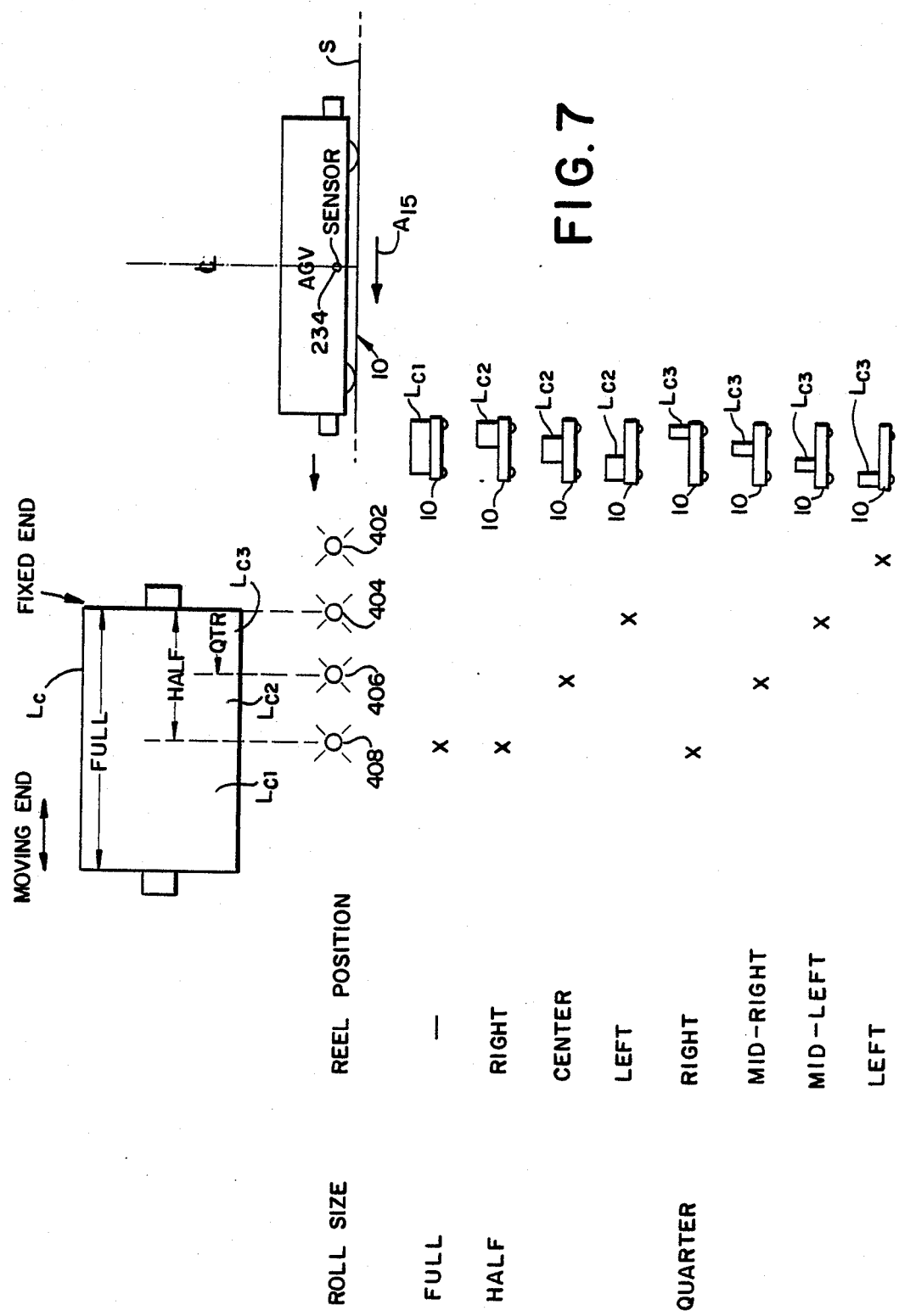
FIG. 7 shows a combined simplified diagram and chart showing the manner in which the vehicle may be located to accommodate various size rolls.

FIG. 7 shows a combined diagram and chart showing the manner in which the sensor 234 shown in FIG. 1 may be utilized to position vehicle 10 relative to the cylindrical load to be positioned thereon. As shown in FIG. 7, which is an elevational view, vehicle 10 moves along surface S toward the load receiving position. The cylindrical load $L_C$, may be either a full length paper roll $L_{C1}$, a half length paper roll $L_{C2}$ or a quarter length paper roll $L_{C3}$. Regardless of the length of the paper roll being loaded, the fixed position or end of the roll to be loaded is always the right hand end.

An array of lamp sources 402, 404, 406, and 408 is arranged adjacent to the load $L_c$ and at positions to enable automatic control over the vehicle 10 to properly position vehicle 10 relative to the load to be received. Each of the light sources 402 through 408 is capable of generating a modulated infrared signal to which the sensor 234 on vehicle 10 is sensitive.

The chart forming part of FIG. 7 shows the manner in which the position of the load is determined.

For example, when a full length paper roll is to be deposited upon vehicle 10, only source 408 is energized. As vehicle 10 moves toward the left, as shown by arrow A15, sensor 234 successively passes 402, 404, and 406. The vehicle 10 continues to move during this time since none of these sources are energized. As sensor 234 becomes aligned with source 408 which is energized, a halt signal is generated to activate the brakes of the drive wheel assemblies causing the vehicle to become aligned with the full length paper roll in the manner shown at the top-most line of the chart of FIG. 7.

Assuming that a half length paper roll is to be loaded onto vehicle 10 with the paper load arranged at the left hand end of the vehicle, only source 404 is energized causing the vehicle to be aligned relative to a half-length load as shown by the fourth line of the chart of FIG. 7.

As still another example, assuming that a quarter length paper roll is to be loaded upon vehicle 10 and is to be positioned at the left-hand-most end thereof, only source 402 is energized causing the load to be located upon vehicle 10 in the position shown at the last line of the chart of FIG. 7. The remaining positions are obtained by appropriate energization of one of the sources 402 through 408 in a manner similar to that described hereinabove.

Figure 8:
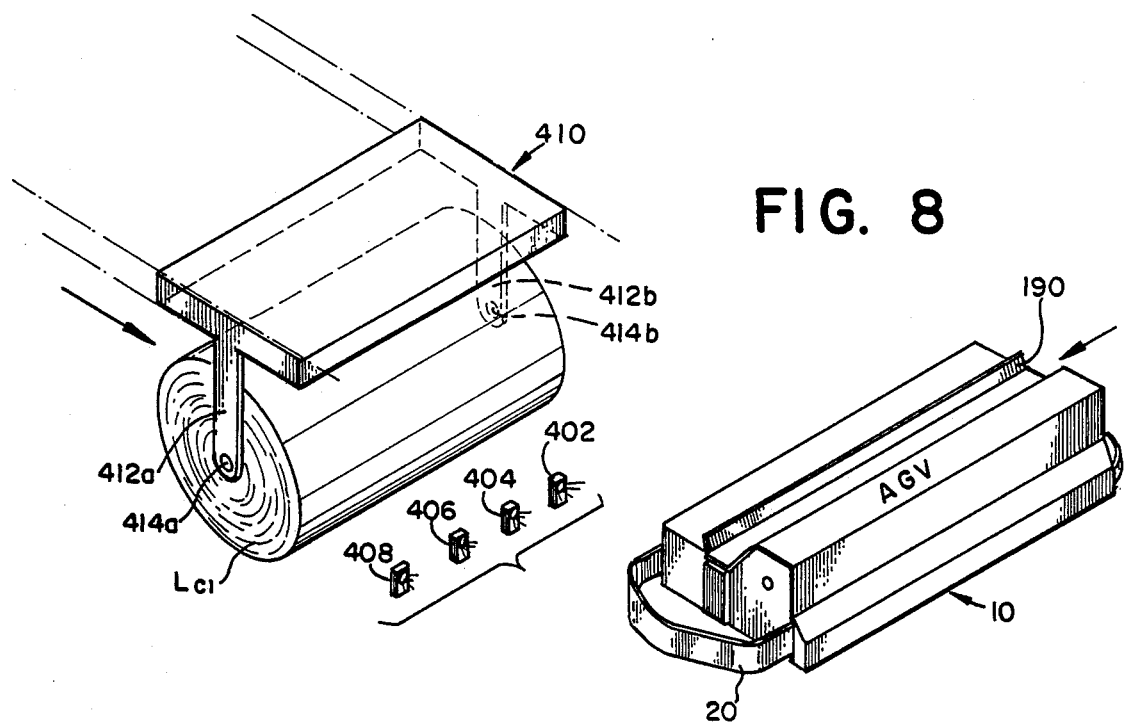
FIG. 8 shows a perspective view of the simplified diagram shown in FIG. 7.

FIG. 8 shows a perspective view of the vehicle 10 and the loader assembly 410 provided with a pair of arms 412a, 412b for receiving and supporting a paper roll such as, for example, a paper roll $L_{C1}$ where the arms are provided with moveable spindle members 414a, 414b arranged to be selectively inserted in the core of the paper roll to support the paper roll and to be removed from the core of the paper roll when the vehicle 10 is positioned therebeneath in order to deposit the paper roll upon vehicle 10.

The sources 402 through 408 shown in FIG. 8 may be arranged along the surface upon which vehicle 10 is moving. The source 408 or an additional independent source may be utilized for moving the vehicle beneath the paper roll during the differential drive mode in addition to aligning the vehicle 10 in the longitudinal direction relative to the load.

Figure 9:
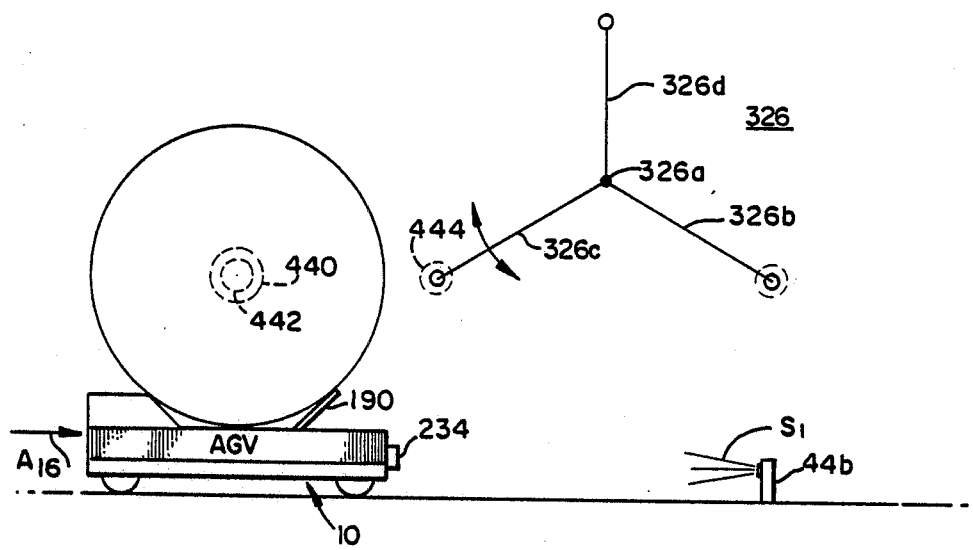
FIG. 9 is a simplified elevational view showing the manner in which the vehicle is positioned relative to the reel stand for dispensing a paper roll.

FIG. 9 shows an arrangement for positioning the paper roll relative to the reel stand 326 which is shown in highly simplified fashion in FIG. 9. The three sets of arms 326b, 326c, and 326d revolve about the central axis 326a and are positionable substantially in the manner shown in FIG. 9 wherein arms 326c are arranged to receive the next paper roll. Each paper roll is provided with metal caps 440 inserted in each end of the paper core 442. Each of the sensor arms are provided with core sensors 444. As the vehicle 10 moves in the direction shown by arrow A16, the roll and hence the end caps move toward the reel stand arms 326c. When the end caps 440 are sensed by the core sensor 444 which may, for example, be a hall-effect sensing device, the core sensor provides a signal to a control unit which is coupled to source 446 for generating a modulated infrared signal $S_1$ which is picked up by the sensor 234 to halt vehicle 10 with the paper roll substantially accurately positioned to receive the spindle members of the reel stan arms 326c, which spindle members may be either manually or automatically operated to be inserted into the opposite ends of core 442.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A vehicle, having one longitudinal side thereto whose height is significantly less than an opposite longitudinal side to faciliate pick up and drop off of a load, for transporting a generally cylindrical-shaped load comprising a frame having front and rear ends and first and second longitudinal sides;

a load cradling platform arranged in said frame, said platform comprising first, second, and third elongated plates arranged a predetermined distance from one another extending between the front and rear of said frame;

the first plate, having a lower side and an upper side, inclined with the lower side closer than the upper side to the second plate;

means for moving the third plate between a first position substantially aligned with said second plate and a second position inclined relative to said second plate;

first and second drive wheel assemblies arranged along one of the longitudinal sides of said frame between said one of said longitudinal sides and the upper side of said inclined first plate;

each of said drive wheel assemblies including a drive wheel;

first and second drive means for rotating the drive wheel of the respective first and second drive wheel assemblies;

means within said housing for rotating the first and second drive wheel assemblies from a first angular orientation for moving the vehicle in either a forward or rearward direction to a second angular orientation transverse to said first angular orientation for moving said vehicle in a direction transverse to said forward and rearward direction;

first and second caster assemblies each having free-wheeling rollers;

said first and second caster assemblies being arranged along the remaining one of said longitudinal sides of said frame opposite the longitudinal side where said first and second drive wheel assemblies are mounted and between said remaining one of said longitudinal sides and said third plate;

means for driving said drive wheel of said first and second drive wheel assemblies when in the second angular orientation for moving said vehicle to a location for delivering the load;

a plurality of sensors arranged at spaced intervals between said first and third plates along an imaginary line parallel to the longitudinal sides of said vehicle for providing signals representative of the presence, length, and position of a load on said vehicle; and means responsive to at least one of said plurality of sensors for raising the third plate to the inclined position at times when the load is placed upon said at least one of said plurality of sensors and for lowering the third plate at times when the load is removed from the plurality of sensors.

2. The vehicle of claim 1 further comprising receiver means responsive to an external command signal for generating a speed control signal the value of said speed control signal being a function of a predetermined characteristic of the external command signal; said motor being responsive to the speed control signal for driving the wheel of its associated drive wheel assemblies at a speed determined by the speed control signal.

3. The vehicle of claim 2 wherein the predetermined characteristic of the command signal is its frequency; said receiver means including frequency sensitive means for generating a speed control signal as a function of the frequency of the command signal.

4. The vehicle of claim 2 wherein the drive means further comprising motor means;

means responsive to the motor current of the motor means driving said first drive wheel assembly for driving said second drive wheel assembly.

5. The vehicle of claim 1 further comprising:

receiver means responsive to a field created in a wire arranged near the surface upon which the vehicle is moving for generating an offset signal responsive to displacement of the central axis of the receiver means from said wire;

means for converting the offset signal to a drive signal for operating said first drive means.

6. The vehicle of claim 5 further comprising means responsive to an external command signal in said wire for generating a speed control signal motor means in said first drive wheel assembly for driving the wheel of said first drive wheel assembly at a selected speed;

means responsive to the operating speed of the motor driving the wheel of said first drive wheel assembly for driving said second drive means which drives the wheel of said second drive wheel assembly at a speed which follows the speed of the wheel of said first drive wheel assembly.

7. The vehicle of claim 5 further comprising first and second steering motor for respectively rotating the first and second drive wheel assemblies about an imaginary vertical axis for steering the vehicle.

8. The vehicle of claim 7 further comprising a sprocket coupled to the output of each steer motor;

a first and second bearing plates secured to the frame and having a plurality of equispaced bearings sandwiched therebetween;

an annular shaped stop plate and driven sprocket surrounding the bearing plates and arranged on the upper and lower sides of said bearings and being secured to one another to assure rotation in unison upon said bearings;

a chain drive coupling said driven and drive sprockets.

9. The vehicle of claim 8 further comprising a limit plate for limiting rotation of said stop plate., said stop plate having a projection for engaging the limit plate to limit rotation of the stop plate in a first direction.

10. The vehicle of claim 9 wherein said stop plate includes a said projection having a pair of bifurcated arms defining an opening;

locking means having a locking head movable into said opening for locking the stop plate and hence the associated drive wheel assembly.

11. A method for operating an automatic guided vehicle for carrying a load from a load receiving to a load dispensing location, said automatic guided vehicle comprising a frame having forward and rearward ends and left and right hand longitudinal sides;

a cradle assembly having a plate moveable to a first position for cradling a cylindrical load and a to a second position for removing said cylindrical load;

wherein the cradle assembly is slideably mounted upon longitudinally oriented shafts on said frame;

locking means for locking the cradle assembly in the cradling position and against longitudinal movement;

sensing means arranged in said cradle assembly for generating a sensing signal in the presence of a load;

said automatic guided vehicle being operated by the method steps including;

swinging said cradle assembly movable plate to its second position responsive to a control signal of a first predetermined condition;

swinging said cradle assembly movable plate to its first position responsive to a control signal of a second predetermined condition which is at least dependent on said sensing signal;

locking the cradle assembly in the cradling position and against longitudinal movement;

driving said automatic guided vehicle away from the load receiving location and the load dispensing location responsive to an external signal of a third predetermined condition; and unlocking said cradle assembly and lowering said cradle assembly movable plate to an uncradled position responsive to an external signal of a fourth predetermined condition.

12. The method of claim 11 wherein the step of lowering the cradle assembly movable plate to the uncradled position further comprises the step of unlocking the cradle assembly against longitudinal movement to permit said cradle assembly to be moved longitudinally to align the load thereon with a load receiving means.

13. The method of claim 12 further comprising the step of driving said automatic guided vehicle to withdraw the vehicle from beneath said load receiving means in response to the sensing of the removal of the load from said cradle assembly.

14. A vehicle for carrying a load from a load receiving location to a load dispensing location, said vehicle comprising a frame having forward and rearward ends and left and right-hand longitudinal sides;

first and second drive wheel assemblies rotatably mounted on one of said longitudinal sides for rotation about imaginary vertical axes, each assembly having a wheel rotatable about an imaginary horizontal axis;

first and second caster assemblies mounted along the remaining longitudinal side of said vehicle for freewheeling rotation of each caster assembly about an imaginary vertical axis, each caster assembly having a wheel freewheelingly rotatable about an imaginary horizontal axis;

a receiver for receiving signals from an external source for conversion into control signals according to the nature of the received signal;

first drive means for rotating said first and second drive wheel assemblies about imaginary vertical axes responsive to signals from said receiver;

second drive means responsive to signals from said receiver for selectively driving the wheels of said first and second drive assemblies about their imaginary horizontal axes;

a cradle assembly mounted upon said frame and having a plate movable to a first position for cradling a cylindrical load and to a second position to facilitate removal of the cylindrical load;

means responsive to said receiver for moving said plate;

a plurality of sensors arranged at spaced intervals between said first and third plates along an imaginary line parallel to the longitudinal sides of said vehicle for providing signals representative of the presence, length, and position of a load on said vehicle; and means responsive to at least one of said plurality of sensors for raising the moveable plate to the first position at times when the load is placed upon said at least one of said plurality of sensors and for lowering the moveable plate to the second position at times when the load is removed from the plurality of sensors.

* * * * *